United States Patent [19]

Watanabe et al.

[11] Patent Number: 5,780,832
[45] Date of Patent: Jul. 14, 1998

[54] BAR CODE READING APPARATUS

[75] Inventors: Mitsuo Watanabe; Ichiro Shinoda, both of Kawasaki, Japan

[73] Assignee: Fujitsu Limited, Kawasaki, Japan

[21] Appl. No.: 677,373

[22] Filed: Jul. 5, 1996

[30] Foreign Application Priority Data

Dec. 5, 1995 [JP] Japan ................. 7-316648

[51] Int. Cl.$^6$ ........................................ G06F 7/10
[52] U.S. Cl. ............................. 235/462; 235/463
[58] Field of Search ........................... 235/462, 463

[56] References Cited

U.S. PATENT DOCUMENTS

| 4,409,469 | 10/1983 | Yasuda et al. | 235/463 |
|---|---|---|---|
| 5,194,722 | 3/1993 | Mergenthaler et al. | 235/456 |
| 5,276,316 | 1/1994 | Blanford | 235/463 |
| 5,278,398 | 1/1994 | Pavlidis et al. | 235/462 |
| 5,296,691 | 3/1994 | Waldron et al. | 235/463 |
| 5,466,921 | 11/1995 | Lapinski et al. | 235/463 |
| 5,495,097 | 2/1996 | Katz et al. | 235/462 |
| 5,548,107 | 8/1996 | Lapinski et al. | 235/467 |

*Primary Examiner*—Harold Pitts
*Attorney, Agent, or Firm*—Armstrong, Westerman, Hattori, McLeland, & Naughton

[57] ABSTRACT

A demodulated data storage buffer stores bar width data sets obtained during one scan with laser beams L through a scan optical system. A CPU sequentially demodulates these bar width data sets and stores the demodulated data storage buffer with the bar width data sets as a series of demodulated data strings. The CPU compares respective items of demodulated data with each other that are included in the demodulated data string and preferentially treats, as effective data, the demodulated data based on "continuous reading" and the "block reading". The CPU conceives as noise data the demodulated data logically impossible from a mutual relationship between these items of demodulated data and deletes the same demodulated data.

13 Claims, 15 Drawing Sheets

FIG. 9

|  | T2 MODULE NUMBER | | | |
|---|---|---|---|---|
|  | 2 | 3 | 4 | 5 |
| 2 | E6 | 00 | E4 | 06 |
| 3 | 09 | E2 / E8 | 01 / 07 | E5 |
| 4 | E9 | 02 / 08 | E1 / E7 | 05 |
| 5 | 06 | E0 | 04 | E3 |

(T1 MODULE NUMBER on left axis)

FIG. 10

| B1 \ B3 | 1 | 2 | 3 |
|---|---|---|---|
| 1 | E7 / E8 | 01 | — |
| 2 | 02 | E1 / E2 | 07 |
| 3 | — | 08 | — |

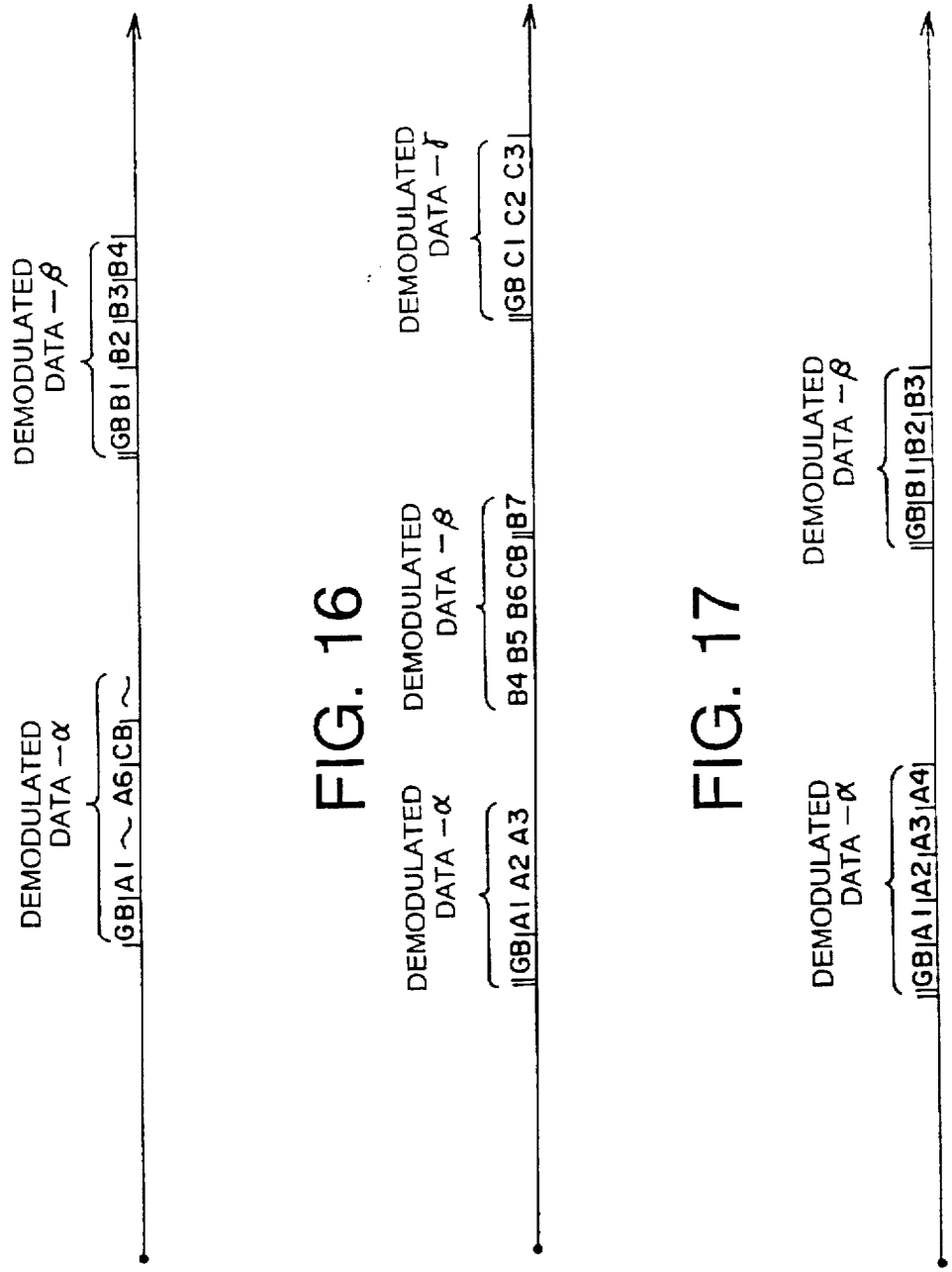

| DATA DEMODULATED WITH BEAM (X) | $\alpha$ | GB,a1,a2,a3 |
| --- | --- | --- |
| | $\beta$ | GB,A1,A2,A3,A4,A5 |
| | $\gamma$ | C1,C2,CB,C3,C4,C5 |
| DATA DEMODULATED WITH BEAM (Y) | $\delta$ | A5,A6,CB,A7,A8,A9,A10,A11,A12,GB |
| | $\varepsilon$ | e1,e2,e3,e4,GB |

BAR CODE READING APPARATUS

BACKGROUND OF THE INVENTION

1. Field of the Invention

The present invention relates generally to a bar code reading apparatus for reading a bar code consisting of blocks of data characters interposed between distinguishing bars with fixed patterns. The present invention relates more particularly to a bar code reading apparatus for acquiring data corresponding to a whole bar code by synthesizing plural pieces of picked-up data obtained by partially reading the bar code.

2. Description of the Prior Art

A practice of managing commercial goods, etc. by using bar codes has been popularized in recent years as represented by a POS system in a distribution business, etc. For example, in the POS system of a store, such items of data as kinds, sales prices, etc. of the goods are encoded in a bar code format, and such data are printed on the goods. Then, the price is paid based on the read bar code at a cash register, and the numbers of sold goods are added up in real time, which might be useful for stocking and purchasing managements.

By the way, the above bar code is classified roughly into a fixed length code such as a WPC code, a JAN code, a UPC code and an EAN code, and a variable length second code. For example, the WPC code has, as illustrated in FIG. 20, a start guard bar (LGB) suffixed to the left end thereof, a center bar (CB) inserted in an intermediate portion thereof and an end guard bar (RGB) suffixed to the right end thereof. A first data block consisting of six data characters (each of which is a minimum unit of an encoded numeral value or symbol) is provided between the start guard bar and the center bar. A second data block composed of six data characters is provided between the center bar and the end guard bar. Each of those guard bars and center bar has special pattern which is predetermined based on the standard respectively, and hence a bar code reading apparatus is capable of detecting these guard bars and center bar.

Further, the bar code reading apparatus is capable of reading, with those guard and center bars as clues, the data characters of the bar code. A reading mode therefor is classified into a "continuous reading" mode, a "block reading" mode and a "divided reading" mode. According to the "block reading" mode, only a data block interposed between one guard bar and the center bar is recognized as data characters constituting the bar code. Then, after separately reading the two data blocks, demodulated data of these two blocks are joined and reproduced as demodulated data corresponding to the single bar code. Further, according to the "continuous reading" mode, two blocks interposed between the two guard bars with the center bar being centered are read at one time and reproduced as demodulated data corresponding to a single bar code. On the other hand, according to the "divided reading" mode, even a data string contiguous to the single guard bar or the center bar is recognized as data characters constituting the bar code. Then, the data characters of respective portions of the bar code are separately read and demodulated, and thereafter the demodulated data corresponding to the single bar code are synthesized based on the demodulated data of all the data characters.

According to the above-described "continuous and block reading" modes, only the data interposed between the guard bar and the center bar is conceived effective and extracted out of the ambient data. Therefore, noises of data based on reflected light beams from surfaces other than the bar code are efficiently removed. While on the other hand, according to an installation type bar code reading apparatus employed at a cash register or the like in a shop, because of the bar code being scanned in every direction with bar code reading laser beams, there is an extremely low possibility of acquiring the demodulated data corresponding to the single entire block by only one laser beam scanning process. It is therefore desirable to use the "divided reading" mode in which the demodulated data corresponding to the whole bar code is synthesized on the basis of fragments of demodulated data exhibiting a high possibility of being obtained by the one laser beam scanning process, in combination with the "continuous reading" mode and the "block reading" mode.

In the case of the "divided reading" mode, however, the data obtained by reading the bar code have to be separated from the noises. More specifically, there must exist at most one data string corresponding to the bar code in the data obtained by the one laser beam scanning process. However, sheet surface noises (such as patterns and so on drawn around the bar code) and noise data obtained by reading letters and so on are superficially hard to be discriminated from the data string obtained by reading the bar code. Hence, there may be such a possibility that the data obtained by reading the bar code are also mixed in those noise data. According to the prior art, all the data including the noise data are demodulated, and there are sequentially checked combinations of respective data strings included in the demodulated data with individual data strings included in other demodulated data.

For example, as shown in FIG. 20, it is assumed that the WPC code is scanned with two laser beams (a beam X and a beam Y), thereby three items of demodulated data ($\alpha$, $\beta$, $\gamma$) obtained with the laser beam X and two items of demodulated data ($\delta$, $\epsilon$) obtained with the laser beam Y. In this case, the data included in respective items of demodulated data are shown in FIG. 21.

In that case, the data obtained by reading the bar code are only the demodulated data $\beta$ with the laser beam X and the demodulated data $\delta$ with the laser beam Y. Hence, if only these two items of demodulated data ($\beta$, $\delta$) are synthesized, the data corresponding to the whole bar code must be fundamentally reproduced. The prior art bar code reading apparatus is, however, incapable of previously extracting the demodulated data ($\beta$, $\delta$) corresponding to the original bar code out of the respective items of demodulated data ($\alpha$-$\epsilon$) before the synthesizing process. Accordingly, while trying to combine the respective items of demodulated data, the apparatus has checked whether the demodulated data corresponding to the whole bar code can be reproduced or not each time the respective items combined.

Consequently, it needs a futile processing time for the checking of the combinations of the noise data, resulting in such a problem that the processing time elongates on the whole. Further, there is a large misreading possibility in which the data obtained by synthesizing the noise data assuming a data configuration similar to the bar code by chance are outputted as the demodulated data corresponding to the whole bar code.

SUMMARY OF THE INVENTION

It is a primary object of the present invention, which was contrived in view of the above problems, to provide a bar code reading apparatus capable of reducing a processing time for an entire divided reading process by logically deleting noise data out of a data string obtained by a laser beam scan and also decreasing a misreading possibility.

To obviate the above-mentioned problems, according to a first aspect of the present invention, a bar code reading apparatus comprises a scanning unit for scanning a surface repeatedly to detect bright/dark patterns along a scan trajectories on the surface, a start-of-scan detecting unit for detecting a start of each scan performed by the scanning unit, and an end-of-scan detecting unit for detecting an end of each scan performed by the scanning unit. The bar code reading apparatus also comprises a demodulating unit for demodulating each bright/dark pattern that is detected by the scanning unit during a period from a timing when the start-of-scan detecting unit detects the start of each scan to a timing when the end-of-scan detecting unit detects the end of each scan to output a series of demodulated data, and an effective data extracting unit for extracting, only a portion having a possibility of corresponding to a bar code from a series of demodulated data that is outputted by the demodulating unit. The bar code reading apparatus further comprises a synthesizing unit for synthesizing a plural pieces of the effective data for a plurality of scan that are extracted by the effective data extracting unit to reproduce data encoded in the bar code.

The bar code is preferably structured in such a way that data characters are interposed between distinguishing bars with fixed patterns, because the distinguishingly bars serve as clues for extracting effective data. The number of the distinguishing bars included in the bar code may be 2 or 3. In the former case, there may be given a variable length code such as, e.g., an ITF code, NW-7, CODE 39 and CODE 128. Further in the latter case, there may be given a fixed length code such as, e.g., a UPC code, a WPC code, a JAN code and an EAN code.

The scanning unit performs the scans repeatedly. The scan may involve an optical scan using a scan optical system. Further, it is desirable that the scanning unit be constructed to effect the respective scans in directions different from each other.

The start- and end-of-scan detecting units may be constructed to employ an optical sensor for detecting an initial position and a terminate position of the scan laser beam in the case that the scanning unit scans with the scan laser beam. Furthermore, if the scanning unit includes a scan optical system such as a polygon mirror and a galvano mirror, a sensor for mechanically detecting an angle of the scan optical system may be employed.

According to a second aspect of the invention, the scanning unit in the first aspect of the invention scans the bar code having such a structure that an encoded data area is divided into two blocks by a single center bar having a fixed pattern and also interposed by two pieces of guard bars having fixed patterns.

According to a third aspect of the invention, the effective data extracting unit in the second aspect of the invention extracts a portion having a structure of being divided into two blocks by the single center bar having the fixed pattern and interposed between the two guard bars having the fixed patterns as the effective data.

According to a fourth aspect of the invention, the effective data extracting unit in the second aspect of the invention extracts a portion having a structure of being interposed between the single center bar and the single guard bar as the effective data.

According to a fifth aspect of the invention, the effective data extracting unit in the fourth aspect of the invention also extracts an item of demodulated data continuing from the center bar positioned outside the portion as the effective data.

According to a sixth aspect of the invention, the effective data extracting unit in the fourth aspect of the invention also extracts an item of demodulated data continuing from another guard bar positioned outside of the portion toward the center bar as the effective data.

According to a seventh aspect of the invention, the effective data extracting unit in the second aspect of the invention extracts an item of demodulated data continuing from the single center bar and another item of demodulated data continuing from the single guard bar both of which extend toward each other as the effective data.

According to an eighth aspect of the invention, the effective data extracting unit in the seventh aspect of the invention also extracts another item of demodulated data continuing from the center bar in a direction opposite to the single guard bar as the effective data.

According to a ninth aspect of the invention, the effective data extracting unit in the seventh aspect of the invention also extracts another item of demodulated data continuing from another guard bar positioned on the side opposite to the single guard bar with the center bar being centered toward the center bar as the effective data.

According to a tenth aspect of the invention, the effective data extracting unit in the second aspect of the invention extracts, if plural pieces of data having same structure of continuing from a guard bar in one direction are included in the series of demodulated data, all these pieces of data as the effective data.

According to an eleventh aspect of the invention, the effective data extracting unit in the second aspect of the invention extracts, if plural pieces of data having same structure of continuing from a guard bar in one direction are included in the series of demodulated data, only the data with a smaller distortion quantity as effective data.

According to a twelfth aspect of the invention, the effective data extracting unit in the second aspect of the invention extracts, if plural pieces of data having same structure of continuing from the center bar in one direction are included in the series of demodulated data, all these pieces of data as the effective data.

According to thirteenth aspect of the invention, the effective data extracting unit in the second aspect of the invention extracts, if plural pieces of data having same structure of continuing from the center bar in one direction are included in the series of demodulated data, only the data with a smaller distortion quantity as the effective data.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a distance demodulation table;

FIG. 10 is a bar width demodulation table;

FIG. 15 is a diagram illustrating a specific example of the demodulated data string;

FIG. 16 is a diagram illustrating a specific example of the demodulated data string;

FIG. 17 is a diagram illustrating a specific example of the demodulated data string;

DESCRIPTION OF THE PREFERRED EMBODIMENTS

Next, embodiments of the present invention will hereinafter be discussed with reference to the accompanying drawings.

First Embodiment
(Principle of Embodiment)

Figure 1:
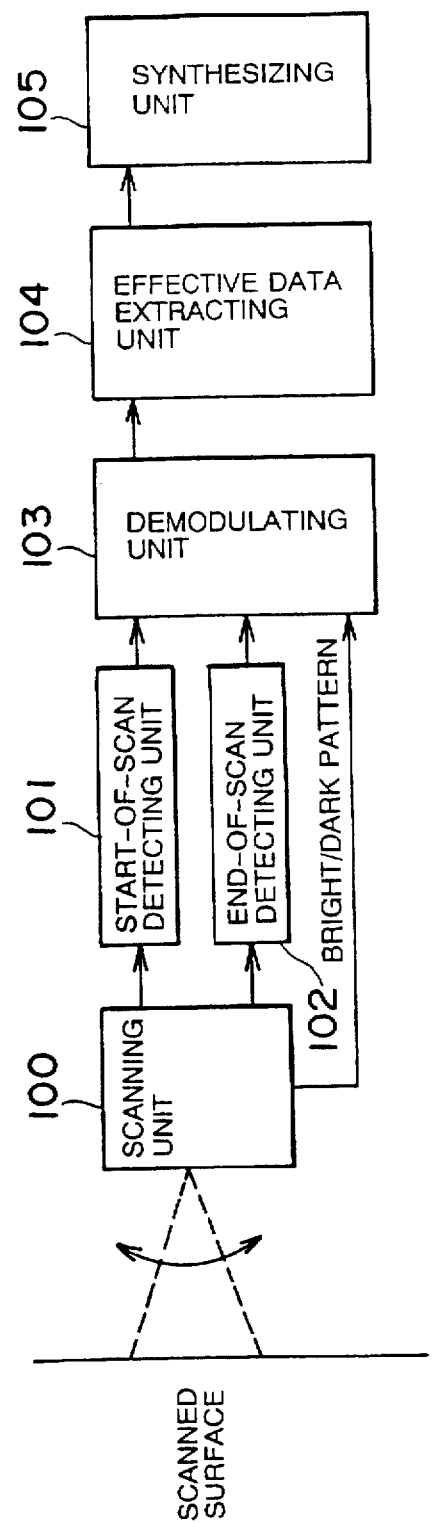
FIG. 1 is a diagram showing the principle of the present invention.

FIG. 1 is a block diagram showing the principle of a first embodiment of a bar code reading apparatus of the present invention. Referring to FIG. 1, a scan unit 100 detects a bright/dark pattern along a scan trajectory on a scanned surface by performing repetitive scanning operations. A start-of-scan detecting unit 101 detects a start of each scanning process by the scan unit 100. Further, an end-of-scan detecting unit 102 detects an end of each scan process by the scan unit 100. A demodulating unit 103 demodulates the bright/dark pattern for one scanning process that is detected by the scan unit 100 during a period from a timing when the start of scan is detected by the start-of-scan detecting unit 101 up to a timing when the end of scan is detected by the end-of-scan detecting unit 102. This demodulation is performed every time the scan is executed by the scan unit 100. Then, an effective data extracting unit 104 extracts only a portion with a possibility of being demodulated data into which bright/dark data obtained by scanning the bar code are demodulated on the basis of a structure of the demodulated data for one scan that are demodulated by the demodulating unit 103, out of the demodulated data for one scan as effective data. Namely, portions other than this portion are deleted. A synthesizing unit 105 synthesizes the plural pieces of effective data by a plurality of scan processes that are extracted by the effective data extracting unit 104 and reproduces the data encoded in the bar code. Accordingly, an object for the synthesizing process by the synthesizing unit 105 is limited to the extracted effective data, and hence a processing time thereof can be remarkably reduced. Besides, a possibility of misreading can be also decreased.

(Whole Construction of Bar Code Reading Apparatus)

Figure 2:
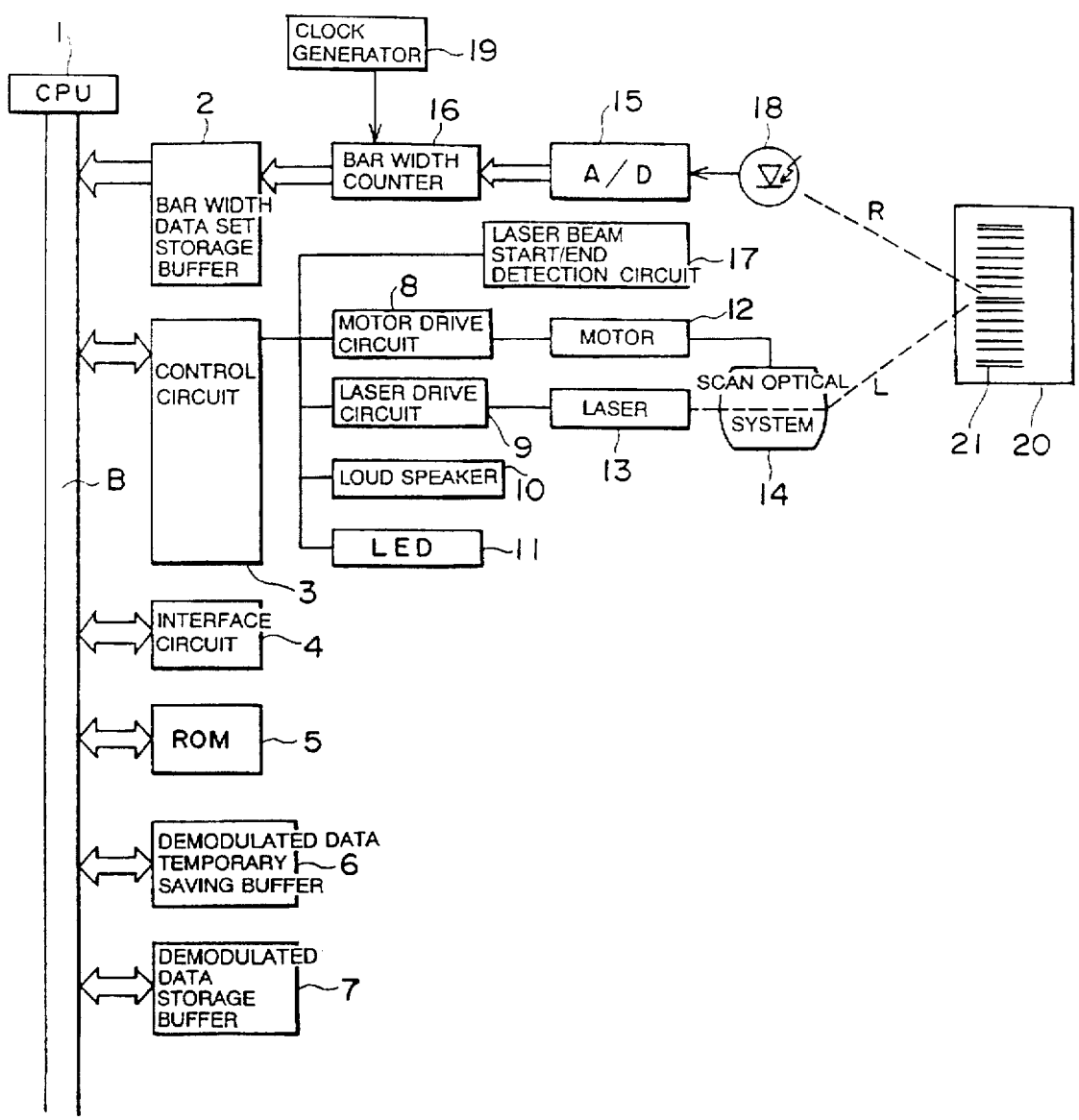
FIG. 2 is a block diagram illustrating a bar code reading apparatus in a first embodiment of the present invention.

FIG. 2 is a block diagram schematically showing a construction of a bar code reading apparatus in the first embodiment of the present invention. The bar code reading apparatus in the first embodiment is an apparatus for reading a bar code 21 into which data are coded in accordance with a WPC code format and which is printed on the surface of the goods 20.

Referring to FIG. 2, a CPU 1 is connected via a bus to a bar width data set storage buffer 2, a control circuit 3, an interface circuit 4, a ROM 5, a demodulated data temporary saving buffer 6 and a demodulated data storage buffer 7. This CPU 1 controls the whole bar code reading apparatus and executes a data demodulation process to demodulate the bar width data set obtained by reading the bar code 21 printed on the surface of the goods 20.

The ROM 5 is a read-only memory stored with a bar code recognizing/demodulating process program which is to be executed by the CPU 1. The interface circuit is a circuit 4 for controlling a status of a bus B for connecting the CPU 1 to other circuit and for controlling a data transmission to an outside device.

The control circuit 3 is a circuit for controlling a motor drive circuit 8, a laser drive circuit 9, a loud speaker 10, a light emitting diode (LED) 11 and a laser beam start/end detecting circuit 17. This motor drive circuit 8 drives a motor 12 to rotate a polygon mirror (which is not shown) constituting a scan optical system 14. Further, the laser drive circuit 9 drives a semiconductor laser 13 to emit laser beams L. Further, the loud speaker 10 emits a voice indicating a completion of reading (demodulating) the bar code. The light emitting diode 11 is a display element for displaying data such as a sales price, etc. of the goods 20, which are obtained as a result of the demodulation of the bar code.

The laser beams L emitted from the semiconductor laser 13 are made incident to the scam optical system 14 and deflected by this scan optical system 14. More specifically, the scan optical system 14 deflects the laser beams L in one direction by use of the polygon mirror (not shown) rotated by the motor 12. A plurality of fixed mirrors are fixed on the side opposite to the polygon mirror. Accordingly, the laser beams L deflected by the polygon mirror are re-reflected in various direction by the respective fixed mirrors, whereby the deflecting direction (which is the scan direction) of the laser beams L is changed to a variety of directions. More specifically, the laser beams L is scanned in a first direction with a first fixed mirror during a such a period that a rotational angle of an unillustrated polygonal mirror falls within a range of angles $\theta_0$–$\theta_1$. The laser beams L is scanned in a second direction with a second fixed mirror during such a period that the rotational angle thereof falls within a range of angles $\theta_1$–$\theta_2$. The laser beams L is scanned in an n-th direction with an n-th fixed mirror during such a period that the rotational angle thereof falls within a range of angles $\theta_{(n-1)}$–$\theta_n$. When the polygonal mirror is further rotated, the laser beams L shift to an adjacent reflecting surface, and the scans are again performed in the first through n-th directions. The scan in each of such directions is called "one scan". Note that the laser beam start/end detecting circuit 17 serving as a start-of-scan detecting unit and an end-of-scan detecting unit as well always monitors the rotational angle of the unillustrated polygonal mirror that rotates in that way.

and detects the fact that a next scan is started upon an end of one scan each time this rotational angle becomes $\theta_0, \theta_1, \ldots \theta_n$.

When the thus scanning laser beams L strike on the surface (containing a bar code 21) of the goods 20, the laser beams L are irregularly reflected from the surface, and some of reflected beams R are received by the light receiving element (which is the photo diode) 18. The light receiving element 18 outputs electric currents corresponding to brightness and darkness of the reflected light beams R received. An A/D converter 15 compares the electric current outputted by the light receiving element 18 with a predetermined threshold value and converts the current into a binary signal. This binary signal indicates "H" level when an intensity of the reflected beams R corresponds to a reflectivity of the black bar in the bar code 21 and "L" level when the intensity of the reflected beams R corresponds to a reflectivity of the white bar in the bar code 21.

A bar width counter 16 measures a period from a rise timing of the binary signal to a fall timing thereof (which is expected to correspond to a width of the black bar in the bar code 21). The bar width counter 16 also measures a period from the fall timing of the binary signal to the rise timing thereof (which is expected to correspond to a width of the white bar in the bar code 21. Note that the bar width counter 16 counts the number of clocks inputted from a clock generator 19 for measuring the time corresponding to each of those bar widths. Read data of the respective bars that are outputted from the bar width counter 16 take such a form that the count value and a color distinguishing signal indicating the white or the black are combined. Such read data are consecutively outputted each time the laser-beam is scanned. The read data that are thus consecutively outputted at every scanning are called a "bar width data set (corresponding to the bright/dark pattern)". The semiconductor laser 13, the scan optical system 14, the light receiving element 18, the A/D converter 15 and the bar width counter 16, which are described above, correspond to a scan unit.

The bar width data set storage buffer 2 temporarily stores the bar width data set. This bar width data set storage buffer 2 sequentially stores the bar width data set inputted from the bar width counter 16 and transfers the bar width data set piece by piece in the sequence in which the data set has been stored in response to a request from the CPU 1.

The demodulated data temporary saving buffer 6 is a memory for storing the demodulated bar width data set. Further, the demodulated data storage buffer 7 is a memory for storing the demodulated data corresponding the whole bar code, on which the synthesizing process is executed.
(Demodulation Algorithm)

Figure 8:
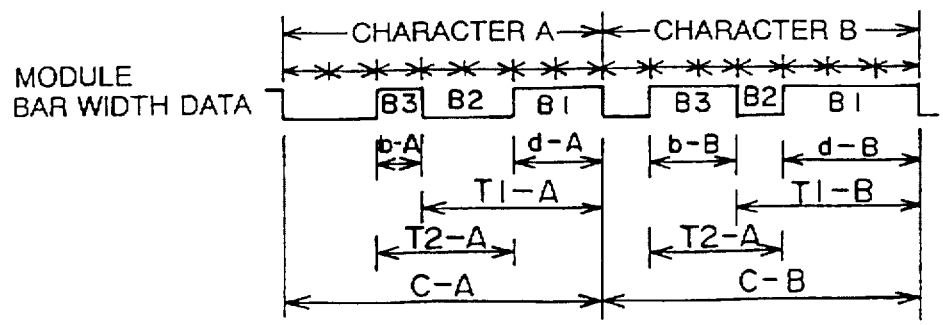
FIG. 8 is a diagram showing a structure of characters of a WPC code.

Next, an outline of a general algorithm for demodulating the WPC code will be explained. Each character in the WPC code is, as illustrated in FIG. 8, composed of a combination of two white bars and two black bars which are formed from each of seven modules (each having a unit length) allocated to the white or the black. A demodulating unit of the CPU 1 calculates a sum length (which is called a T1 module) of a length of a tail black bar (B1) of each character and a length of a white bar (B2) just anterior thereto. The same demodulating unit calculates also a sum length (which is called a T2 module) of a length of the white bar (B2) and a length of a black bar (B3) just anterior thereto. These T1 and T2 modules are referred to as a "δ distance". Then, the demodulating unit of the CPU 1 reads corresponding data on the basis of a module number of each of the T1 and T2 modules with reference to a distance demodulation table shown in FIG. 9. Note that the reference symbol "E-" of each item of data shown in FIG. 9 represents a value of an even-numbered parity, while "0-" designates a value of an odd-numbered parity.

Incidentally, in the distance demodulation table shown in FIG. 9, in the case the number of modules included in each of the T1 and T2 modules is 3 or 4, there are two kinds of corresponding data are prepared, and any one of these items of data can not be therefore specified. Hence, in this case, the demodulating unit of the CPU 1 specifies which data it is on the basis of the module number of the black bar (B1) and the black bar (B3) with reference to a bar width demodulation table shown in FIG. 10. For example, the character A and the character B shown in FIG. 8 are demodulated as "02" or "8" with reference to the distance demodulation table shown in FIG. 9. Further, the character A is specified as "02", while the character B is specified as "08" with reference to the bar width demodulation table shown in FIG. 10.
(Check of Distortion Quantity)

Next, a method of checking a distortion quantity that is executed in this embodiment will be explained. The check of the distort ion quantity involves a "check of distortion quantity of character", a "check of distortion quantity of δ distance" and a "check of distortion quantity of each bar".

Figure 11:
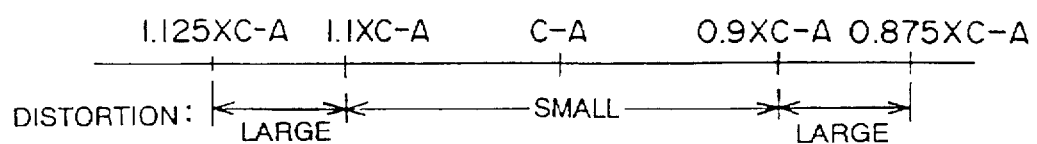
FIG. 11 is an explanatory diagram of a distortion quantity of an adjacent character length.

According to the "check of distortion quantity of character", as illustrated in FIG. 11, the distortion quantity is determined to be small when a bar width count value (C-B) of the character falls within a range of 0.9 through 1.1 times a bar width count value (C-A) of the character which was an object of the check just anterior thereto and determined to be large when it exceeds the range.

Figure 12:
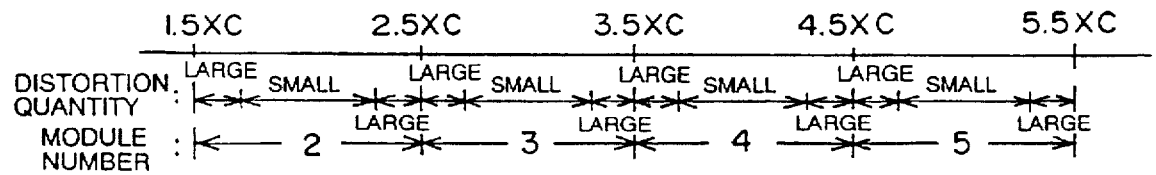
FIG. 12 is a conversion chart of a distortion quantity of 6 distance.

According to the "check of distortion quantity of δ distance", a count value obtained by equally dividing by 7 a total sum (C-B) of all the bar width count values in the characters which is an object of the check is substituted into a value of "c" in a Table shown in FIG. 12. Then, the module number of each δ distance is read based on the bar width counter values (T1-B, T2-B) of the respective δ distances with reference to the Table of FIG. 12. And, a distortion quantity thereof is determined to be small or large.

Figure 13:
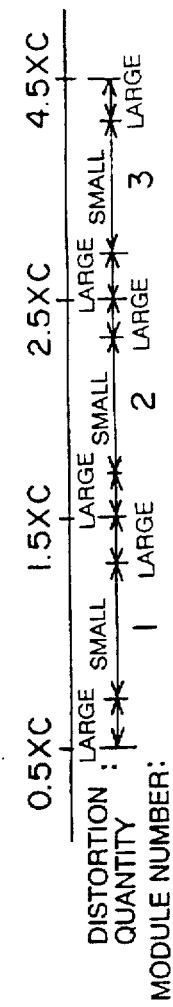
FIG. 13 is a conversion chart of a distortion quantity of each bar.

According to the "check of distortion quantity of each bar", the count value obtained by equally dividing by 7 the total sum (C-B) of all the bar width count values in the characters which i an object of the check is substituted into a value of "c" in a Table shown in FIG. 13. Then, the module number of each bar is read based on the bar width counter values (b-B, d-B) of the respective bars with reference to the Table of FIG. 13. Then, a distortion quantity thereof is determined to be small or large.
(Bar Code Recognizing/Demodulating Process)

Next, particulars of a bar code recognition/demodulation process program actually executed by a CPU 1 will be explained with reference to flowcharts shown in FIGS. 3 through 7.

Figure 3:
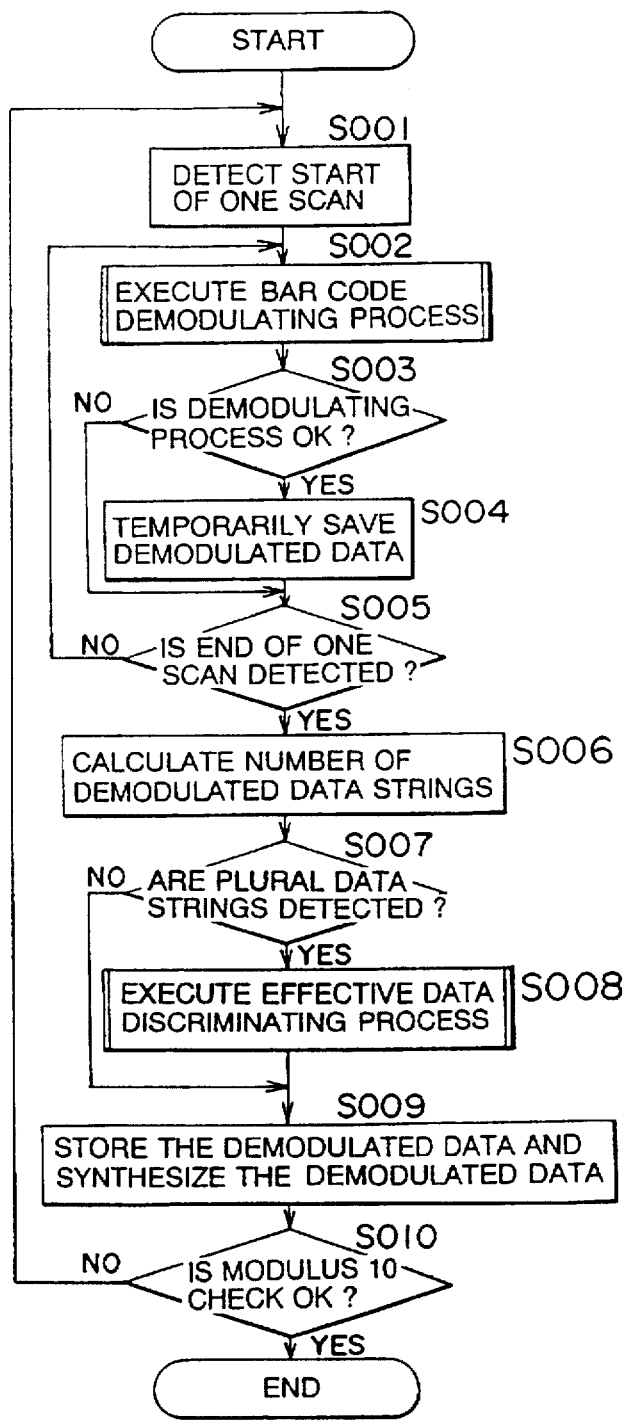
FIG. 3 is a flowchart showing a bar code recognition/demodulation processing program executed by a CPU shown in FIG. 2.

FIG. 3 shows the flowchart of a main routine of the bar code recognizing/demodulating process. This main routine starts when a main power is supplied the bar code reading apparatus. Detected in first step S001 is a start of scan by the laser beams during one scan. This detection is performed based on a result of detection by the laser beam start/end detecting circuit 17
(corresponding to a start-of-scan detecting unit).

Figure 4:
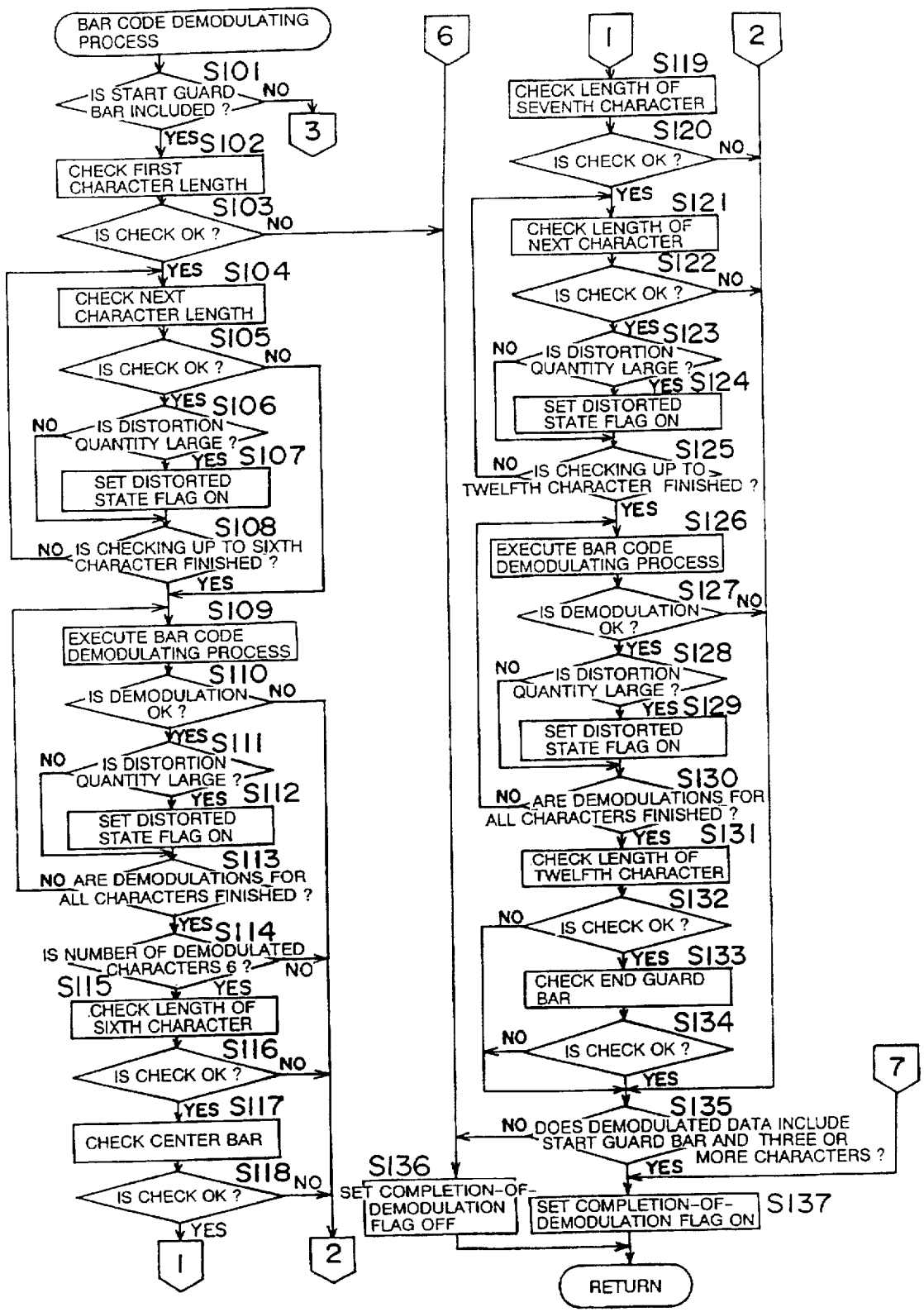
FIG. 4 is a flowchart showing a bar code demodulating process executed in step S002 of FIG. 3.
Figure 5:
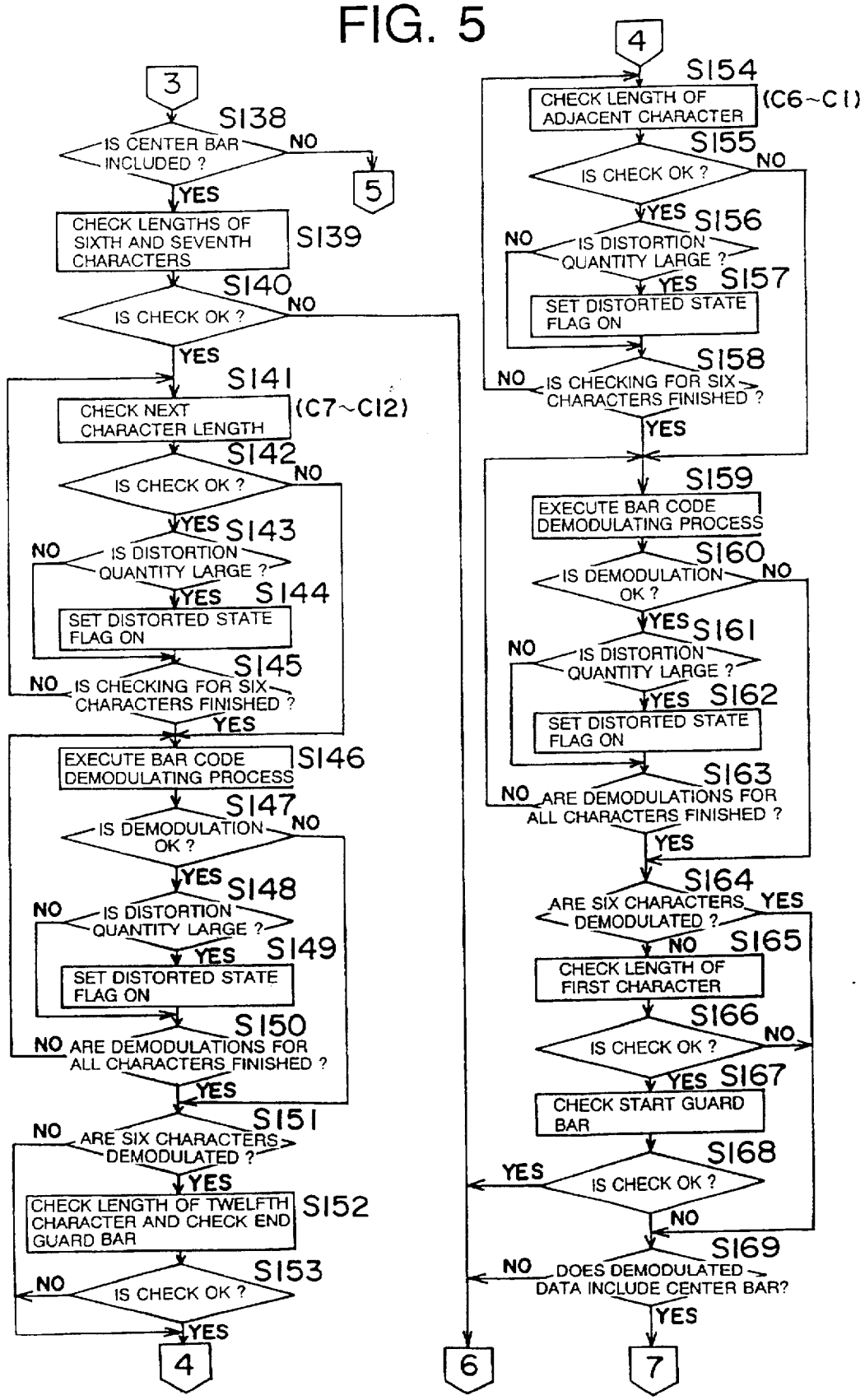
FIG. 5 is a flowchart showing the bar code demodulating process executed in step S002 of FIG. 3.
Figure 6:
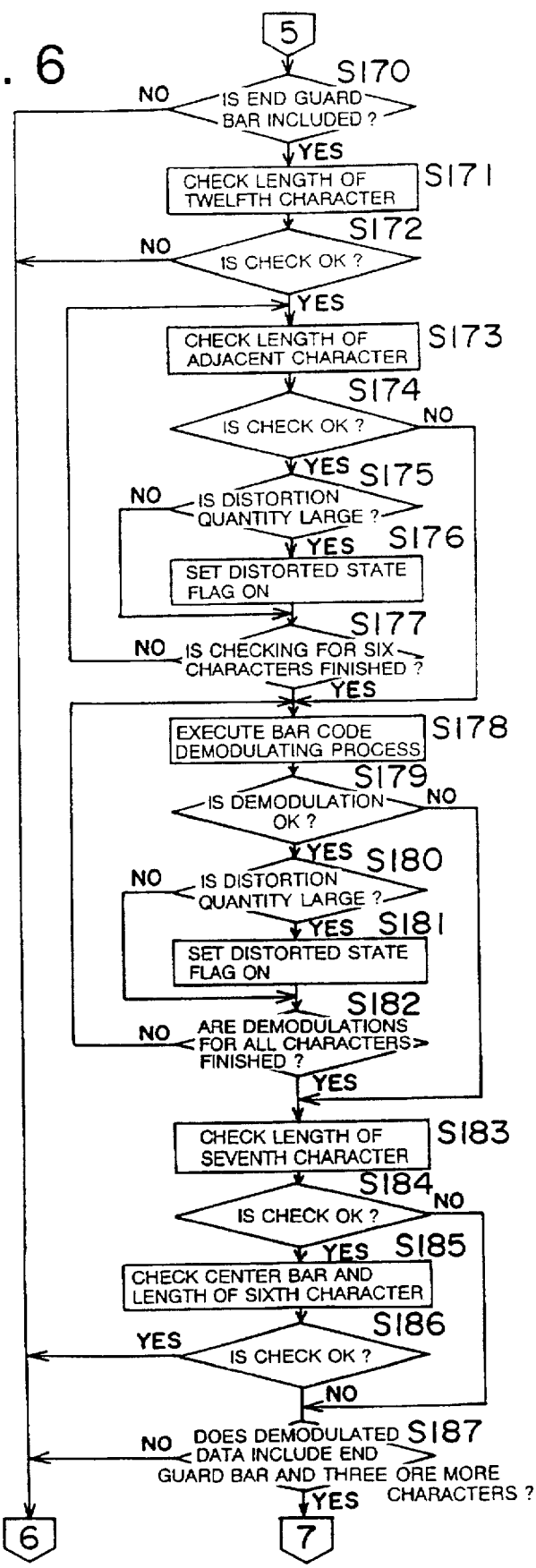
FIG. 6 is a flowchart showing the bar code demodulating process executed in step S002 of FIG. 3.

When the start of the scan by the laser beams is thus detected, in step S002, a bar code demodulation process is executed (corresponding to a demodulating unit). FIGS. 4 to 6 are flowcharts showing the subroutine of the bar code demodulation process. In first step S101 after entering this subroutine, the oldest bar width data set is fetched out of the bar width data set storage buffer 2, and whether the fetched bar width data set includes the start guard bar (LGB) is checked. Then, if the same bar width data set includes the start guard bar, the processing proceeds to step S102. Steps S102 through S135 involve processes for demodulating the characters as far as possible to be demodulated with the start guard bar up to such a position as to be possible of demodulation.

In step S102, a length of a first character (next to the start bar on the side toward the center bar) is checked. More specifically, it is checked whether or not a total sum of bar width count values of four bars forming the first character is in the vicinity of a fixed value. Then, if the length of the first character is not in the vicinity of the fixed value (S103), the bar width data set to be processed is conceived as based on a pattern other than the bar code. In this case, a "completion-of-demodulation flag" is reset in step S136, and this subroutine is ended. Contrastingly, if the length of the first character is in the vicinity of the fixed value (S103), the processing proceeds to step S104.

In step S104, a length of the next character (which is defined as second character next to the first character in the initial status) is checked. Then, if the length of this character is not in the vicinity of the fixed value (S105), the processing proceeds to step S109 to demodulate the characters in the first block of which length has hitherto been determined to be in the vicinity of the fixed value. Contrastingly, if the length of the same character is in the vicinity of the fixed value (S105), whether a distortion quantity of the character to be processed is large is checked in step S106. More specifically, as discussed above, there are executed the "check of distortion quantity of character", the "check of distortion quantity of δ distance", and the "check of distortion quantity of each bar". Subsequently, if all the distortion quantities of the character are small, the processing proceeds directly to step S108. If any one of the distortion quantities of the character is large (i.e., if a ratio between items of bar width data (which are bright/dark data) corresponding to the respective characters exceeds a fixed range, or if a ratio between items of bar width data (which are bright/dark data) corresponding to the respective modules exceeds a fixed range), however, the processing proceeds to step S108 after setting a "distorted state flag" in step S107. Checked in step S108 is whether the checking processes of the lengths of the characters are finished up to the-sixth character (adjacent to the center bar on the side toward the start bar). Then, when the checks of the lengths of the characters are finished up to the sixth character, the processing proceeds to step S109 to demodulate the six characters constituting the first block. Whereas, if the checks of the lengths of characters are not yet finished up to the sixth character, the processing is returned to step S104 to check a length of the next character adjacent thereto.

In step S109, the character closest to the start guard bar is fetched out of the characters of which lengths are determined to be in the vicinity of the fixed value in steps S103 and S105, and the demodulating process for the fetched character is executed. In next step S110, whether the demodulating process in step S109 succeeds or not is checked. Then, if the demodulating process does not succeed, the processing proceeds to step S135 to finish this subroutine. If the demodulating process succeeds, the processing proceeds to step S111. In step S111, whether the distortion quantity of the character is large is checked. Then, if the distortion quantity of the character is small, the processing proceeds directly to step S113. Whereas, if the distortion quantity of the character is large, the "distorted state flag" is set in step S112, and the processing proceeds to step S113. Checked in step S113 is whether there are completed the demodulating processes corresponding to the number of all the characters of which lengths are determined to be in the vicinity of the fixed value in the character length checking in steps S103 and S105. Then, if the demodulating processes for all the characters are not yet completed, the processing returns to step S109 to execute the demodulating process for the next adjacent character. In contrast with this, if the demodulating processes for all the characters are completed, the processing proceeds to step S114.

Checked in step S114 is whether the number of the characters that have been demodulated by the demodulating process in step S109 is 6. Then, if the number of the character is less than 6, there is nothing but such a possibility that the bar width data set to be processed is obtained by the "divided reading", and hence the processing proceeds to step S135 to finish this subroutine. Contrastingly, if the number of characters that have been demodulated is 6, the processing proceeds to step S115.

In step S115, the length of the sixth character is again checked. Subsequently, if the length of the sixth character is not in the vicinity of the fixed value (S116), the processing proceeds to step S135. Consequently, if the length of the sixth character is in the vicinity of the fixed value (S116), the center bar is checked in step S117. This check of the center bar is a process of checking whether the character next adjacent to the sixth character coincides with a predetermined pattern set as the center bar. Then, when a desirable result of the center bar checking is obtained (S118), the processing proceeds to step S119. Contrastingly, when no desirable result of the center bar checking is obtained (S118), the bar width data set to be processed is determined to be a bar width data set obtained by the "divided reading", and the processing therefore proceeds to step S135 to finish this subroutine.

In step S119, a length of a seventh character (next to the center bar on the side toward the end guard bar) is checked. Then, if the length of the seventh character is not in the vicinity of a fixed value (S120), the bar width data set to be processed is determined not to be the bar width data set obtained by the "continuous reading", and hence the processing proceeds to step S135 to finish this subroutine. Whereas, if the length of the seventh character is in the vicinity of the fixed value (S120), the processing proceeds to step S121.

Checked in step S121 is a length of the next character (which is an eighth character next to the seventh character in the initial status). Then, if the length of the eighth character is not in the vicinity of a fixed value (S122), the bar width data set to be processed is determined not to be the bar width data set obtained by the "continuous reading", and hence the processing proceeds to step S135 to finish this subroutine. Whereas, if the length of the eighth character is in the vicinity of the fixed value (S122), whether the distortion quantity of the character to be processed is large is checked in step S123. Subsequently, if the distortion quantity of the character is small, the processing proceeds directly to step S125. If the distortion quantity of the character is large, however, the processing proceeds to step S125 after setting the "distorted state flag" in step S124. Checked in step S125 is whether the checking of lengths of characters are finished up to a twelfth character (adjacent to the end guard bar on the side toward the center bar). Then, if the checks of the lengths of the characters up to the twelfth character are finished, the processing proceeds to step S126 to demodulate six pieces of characters constituting a second block. Whereas, if the checking of the lengths of the characters up to the twelfth character is not yet finished, the processing returns to step S121 to check a length of the character next adjacent thereto.

In step 126, the character closest to the center bar is fetched out of the characters of which lengths are determined to be in the vicinity of the fixed value in steps S120 and S122, and the demodulating process for the fetched character is executed. In next step S127, whether the demodulating process in step S126 succeeds or not is checked. Then, if the demodulating process does not succeed, the processing proceeds to step S135 to finish this subroutine. If the demodulating process succeeds, the processing proceeds to step S128. In step S128, whether the distortion quantity of the character to be processed is large is checked. Then, if the distortion quantity of the character is small, the processing proceeds directly to step S130. Whereas, if the distortion quantity of the character is large, the "distorted state flag" is set in step S129, and the processing proceeds to step S130. Checked in step S130 is whether there are completed the demodulating processes corresponding to the number of the characters of which lengths are determined to be in the vicinity of the fixed value in the character length checking in steps S120 and S122. Then, if the demodulating processes for all the characters are not yet completed, the processing returns to step S126 to execute the demodulating process for the next adjacent character. In contrast with this, if the demodulating processes for all the characters are completed, the processing proceeds to step S131.

In step S131, the length of the twelfth character is again checked. Subsequently, if the length of the twelfth character is not in the vicinity of the fixed value (S132), the processing proceeds to step S135. If the length of the twelfth character is in the vicinity of the fixed value (S132), the end guard bar is checked in step S133. This check of the end guard bar is a process of checking whether the character next adjacent to the twelfth character coincides with a predetermined pattern set as the end guard bar. Then, when a desirable result of the end guard bar checking is obtained (S134), the bar width data set to be processed is determined to be the bar width data set obtained by the "continuous reading", and therefore processing proceeds to step S135. Contrastingly, when no desirable result of the end guard bar checking is obtained (S134), the bar width data set to be processed is determined to be the bar width data set obtained at least by the "block reading", and the processing therefore proceeds to step S135 to finish this subroutine.

Checked in step S135 is whether the data completely demodulated in steps S109 and S126 include the start guard bar and three or more characters. Then, if the completely demodulated data include the start guard bar and the three or more characters, the bar width data set to be processed can be determined to be the bar width data set obtained by at least the "divided reading", and hence a "completion-of-demodulation flag" is set in step S137, thus finishing this subroutine. Contrastingly, if the same data do not include the start guard bar and the three or more characters, a reliability on the data is comparatively low, the "completion-of-demodulation flag" is reset in step S136, and this subroutine is finished.

On the other hand, when it is judged that the bar width data set does not include the start guard bar, there is no such possibility that the bar width data set to be processed is obtained on the "continuous reading", the processing proceeds to step S138. In step S138, whether the bar width data set to be processed includes the center bar is checked. Then, if the center bar is included therein, the processing proceeds forward to step S139. Steps S139 through S169 involves processes for demodulating the characters as far as possible to be demodulated in bilateral directions with the center bar as the center point.

In step S139, the lengths of the sixth and seventh characters are checked. Then, if both of the lengths of the sixth and seventh characters are not in the vicinity of the fixed value (S140), the bar width data set to be processed is conceived as a data set based on a pattern other than of the bar code. In this case, the "completion-of-demodulation flag" is reset in step S136, and this subroutine comes to an end. In contrast with this, if any one of the lengths of the sixth and seventh characters is in the vicinity of the fixed value (S140), the processing proceeds to step S141.

Checked in step S141 is a length of the next character (which is the seventh character in the initial status) on the side toward the end guard bar. Subsequently, if the length of the same adjacent character is not in the vicinity of the fixed value (S142), the processing proceeds to step S146 to demodulate the characters in the second data block of which length has hitherto been determined to be in the vicinity of the fixed value. Contrastingly, if the length of this character is in the vicinity of the fixed value (S142), whether the distortion quantity of the character to be processed is large or not is checked in step S143. Then, if the distortion quantity of the character is small, the processing proceeds directly to step S145. Whereas, if the distortion quantity of the character is large, the "distorted state flag" is set in step S144, and thereafter the processing proceeds forward to step S145. Checked in step S145 is whether the checking of the lengths of the six characters forming the second data block is finished. Then, if the checks of the lengths of the six characters are finished, the processing proceeds to step S146 to demodulate those six characters. Whereas, if the checks of the lengths of the six characters are not yet finished, the processing returns to step S141 to check a length of the next adjacent character.

In step S146, the character closest to the center bar is fetched out of the characters of which lengths are determined to be in the vicinity of the fixed value in steps S142, and the demodulating process for the fetched character is executed. In next step S147, whether the demodulating process in step S146 succeeds or not is checked. Then, if the demodulating process does not succeed, the processing proceeds directly to step S151. If the demodulating process succeeds, the processing proceeds to step S148. In step S148, whether the distortion quantity of the character to be processed is large is checked. Then, if the distortion quantity of the character is small, the processing proceeds directly to step S150. Whereas, if the distortion quantity of the character is large, the "distorted state flag" is set in step S149, and the processing proceeds to step S150. Checked in step S150 is whether there are completed the demodulating processes corresponding to the number of all characters of which lengths are determined to be in the vicinity of the fixed value in the character length checking in step S142. Then, if the demodulating processes for all the characters are not yet completed, the processing returns to step S146 to execute the demodulating process for the next adjacent character. In contrast with this, if the demodulating processes for all the characters are completed, the processing proceeds to step S151.

Checked in step S151 is whether the number of the characters that have been demodulated by the demodulating process in step S146, is 6. Then, if the number of the character is less than 6, the processing proceeds to step S154 to demodulate the characters included in the first data block. Contrastingly, if the number of the characters that have been demodulated is 6, the processing proceeds to step S152.

In step S152, the length of the twelfth character is again checked, and the end guard bar is checked. Subsequently, in any case (S153), the processing proceeds to step S154 to demodulate the characters included in the first data block.

Checked in step S154 is a length of the adjacent character (which is the sixth character in the initial status) on the side toward the start guard bar. Then, if the length of the this adjacent character is not in the vicinity of the fixed value (S155), the processing proceeds to step S159 to demodulate the characters in the first data block of which length has hitherto been determined to be in the vicinity of the fixed value. Contrastingly, if the length of the same character is in the vicinity of the fixed value (S155). Whether the distortion quantity of the character to be processed is large or not is checked in step S156. Then, if the distortion quantity of the character is small, the processing proceeds directly to step S158. Whereas, if the distortion quantity of the character is large, the "distorted state flag" is set in step S157, and thereafter the processing proceeds to step S158. Checked in step S158 is whether the checking of the lengths of the six characters forming the first data block is finished. Then, if the checks of the lengths of the six characters are finished, the processing proceeds to step S159 to demodulate those six characters. Whereas, if the checks of the lengths of the six characters are not yet finished, the processing returns to step S154 to check a length of the next adjacent character.

In step S159, the character closest to the center bar is fetched out of the characters of which lengths are determined to be in the vicinity of the fixed value in steps S155, and the demodulating process for the fetched character is executed. In next step S160, whether the demodulating process in step S159 succeeds or not is checked. Then, if the demodulating process does not succeed, the processing proceeds directly to step S164. If the demodulating process succeeds, the processing proceeds to step S161. In step S161, whether the distortion quantity of the character to be processed is large or not is checked. Then, if the distortion quantity of the character is small, the processing proceeds directly to step S163. Whereas, if the distortion quantity of the character is large, the "distorted state flag" is set in step S162, and thereafter the processing proceeds to step S163. Checked in step S163 is whether there are completed the demodulating processes corresponding to the number of all characters of which lengths are determined to be in the vicinity of the fixed value in the character length checking in step S155. Then, if the demodulating processes for all the characters are not yet completed, the processing returns to step S159 to execute the demodulating process for the next character. In contrast with this, if the demodulating processes for all the characters are completed, the processing proceeds to step S164.

Checked in step S164 is whether the number of the characters that have been demodulated by the demodulating process in step S159 is 6. Then, if the number of the characters is 6, the processing proceeds to step S169. If less than 6, the processing proceeds to step S165.

In step S165, the length of the first character is checked. If the length of the first character is not in the vicinity of the fixed value (which includes a case where the first character is lost) (S166), the processing proceeds to step S169. Whereas, if the length of the first character is in the vicinity of the fixed value (S166), the start guard bar is checked in step S167. Then, if the start guard bar is detected (S168), this is contradictory to the determination made in step S101, and hence the "completion-of-demodulation flag" is reset in step S136, thus finishing this subroutine. Whereas, if the start guard bar is not detected (S168), the processing proceeds to step S169.

Checked in step S169 is whether the completely demodulated data set is has such a construction that characters are continuously linked to both sides of the center bar. Then, if the data set has the construction, the "completion-of-demodulation flag" is set in step S137, and this subroutine is finished. Contrastingly, if the data set does not have the above-described construction, this implies a situation that might hardly happen, and the data reliability of the data set is low. Therefore, the "completion-of-demodulation flag" is reset in step S136, and this subroutine is ended.

On the other hand, when it is judged that the bar width data set does not include the center bar in step S138, the bar width data set to be processed is not obtained by the "block reading", the processing proceeds to step S170. In step S170, whether the bar width data set to be processed includes the end guard bar is checked. Then, if the end guard bar is included therein, the bar width data set to be processed is conceived as based on a pattern other than the bar code. In this case, the "completion-of-demodulation flag" is reset in step S136, and this subroutine comes to an end. In contrast with this, if the bar width data set includes the end guard bar, the processing proceeds to step S171. Steps S171 through S187 involve processes for demodulating as far as possible to be demodulated in direction toward the center bar with the end guard bar as the starting point.

In step S171, the length of the twelfth character is checked. Subsequently, if the length of the twelfth character is not in the vicinity of the fixed value (S172), the bar width data set to be processed is conceived as a data set based on a pattern other than the bar code. In this case, the "completion-of-demodulation flag" is reset in step S136, and this subroutine comes to an end. In contrast with this, if the length of the twelfth character is in the vicinity of the fixed value (S172), the processing proceeds to step S173.

Checked in step S173 is a length of the adjacent character (which is an eleventh character in the initial status) on the side toward the center bar. Subsequently, if the length of the same adjacent character is not in the vicinity of the fixed value (S174), the processing proceeds to step S178 to demodulate the characters in the second data block of which lengths has hitherto been determined to be in the vicinity of the fixed value. Contrastingly, if the length of this character is in the vicinity of the fixed value (S174), whether the distortion quantity of the character to be processed is large or not is checked in step S175. Then, if the distortion quantity of the character is small, the processing proceeds directly to step S177. Whereas, if the distortion quantity of the character is large, the "distorted state flag" is set in step S176, and thereafter the processing proceeds to step S177. Checked in step S177 is whether the checking of the lengths of the six characters forming the second data block is finished. Then, if the checks of the lengths of the six characters are finished, the processing proceeds to step S178 to demodulate those six characters. Whereas, if the checks of the lengths of the six characters are not yet finished, the processing returns to step S173 to check a length of the next adjacent character.

In step S178, the character closest to the end guard bar is fetched out of the characters of which lengths are determined to be in the vicinity of the fixed value in steps S172 or S174, and the demodulating process for the fetched character is executed. In next step S179, whether the demodulating process in step S178 succeeds or not is checked. Then, if the demodulating process does not succeed, the processing proceeds directly to step S183. If the demodulating process succeeds, the processing proceeds to step S180. In step S180, whether the distortion quantity of the character is large is checked. Then, if the distortion quantity of the character is small, the processing proceeds directly to step S182. Whereas, if the distortion quantity of the character is large, the "distorted state flag" is set in step S181, and the processing proceeds to step S182. Checked in step S182 is whether there are completed the demodulating processes corresponding to the number of all characters of which lengths are determined to be in the vicinity of the fixed value in the character length checking in step S172 or S174. Then, if the demodulating processes for all the characters are not yet completed, the processing returns to step S178 to execute the demodulating process for the next adjacent character. In contrast with this, if the demodulating processes for all the characters are completed, the processing proceeds to step S183.

In step S183, the length of the seventh character is checked. Then, if the length of the seventh character is not in the vicinity of the fixed value (which includes a case where the seventh character is lost) (S184), the processing proceeds to step S187. Whereas, if the length of the seventh character is in the vicinity of the fixed value (S184), the center bar and the length of the sixth character are checked in step S185. Then, if the center bar is detected, or if the length of the sixth character is in the vicinity of the fixed value (S186), this is contradictory to the determination made in step S138, hence the "completion-of-demodulation flag" is rest in step S136, and this subroutine is finished. Whereas, if the center bar is not detected (S186), the processing proceeds to step S187.

Checked in step S187 is whether the data completely demodulated in step S178 include the end guard bar and three or more characters. Then, if the completely demodulated data include the end guard bar and the three or more characters, the bar width data set to be processed can be determined to be the bar width data set obtained by at least the "divided reading", and hence the "completion-of-demodulation flag" is set in step S137, this subroutine is finished. Contrastingly, if the same data do not include the end guard bar and the three or more characters, the reliability on the data is comparatively low, the "completion-of-demodulation flag" is reset in step S136, and this subroutine is finished.

In the main routine shown in FIG. 3 to which the processing is returned from the bar code demodulation processing subroutine, in next step S003, it is checked whether the "completion-of-demodulation flag" is set in the RAM area within the CPU 1. This "completion-of-demodulation flag" is a flag set in step S137 (FIG. 4) in the bar code demodulating process in step S002, and also a flag for indicating that at least any one of the guard bar and the center bar and the three or more data characters subsequent thereto are demodulated.

When this "completion-of-demodulation flag" is set, in step S004, the demodulated data temporary saving buffer 6 stores the demodulated data, and thereafter the processing proceeds to step S005. Whereas, if the "completion-of-demodulation flag" is not set, the processing proceeds directly to step S005. In this case, the bar width data set to be processed in this time is discarded.

Checked in step S005 is whether the end of the laser beam scan of which start was detected in step S001 is detected or not. This end detection is performed based on a result of the detection by the laser beam start/end detecting circuit 17. Then, if the termination thereof is not yet detected, there must be such a possibility that the bar width data set storage buffer 2 stores a new item of bar width data set. Then, there must be also a possibility in which the bar width data set demodulated in step S002 in the loop processing of this time is defined as noise data, and the new bar width data set is obtained by reading the bar code. Therefore, if the termination thereof is not yet detected, a next bar width data set is newly fetched from the bar width data set storage buffer 2, and the bar code demodulation process in step S002 is executed.

Contrastingly, if the termination of the laser beam scan is detected, in step S006, there is calculated the number of demodulated data strings stored in the demodulated data temporary saving buffer 6 at the present time. The number of these demodulated data strings is calculated on the assumption that all pieces of demodulated data is obtained during one scan form a single demodulated data string.

Then, if the number of the demodulated data strings stored in the demodulated data temporary saving buffer 6 at the present time is 1 or 0, this implies a case where no demodulated data is obtained at all, a case where the demodulate data are obtained by the "continuous reading", and a case where a single piece of data based on the "block reading" or the "divided reading" is obtained. Consequently, the processing proceeds directly to step S009.

Contrastingly, if the number of demodulated data strings stored in the demodulated data temporary saving buffer 6 at the present time is plural, in step S008, an effective data discriminating process is executed on the demodulated data string stored latest (which corresponds to an effective data extracting unit). This effective data discriminating process is a process of extracting only the effective demodulated data (obtained by reading the bar code and having a high probability) out of the demodulated data strings.

Figure 7:
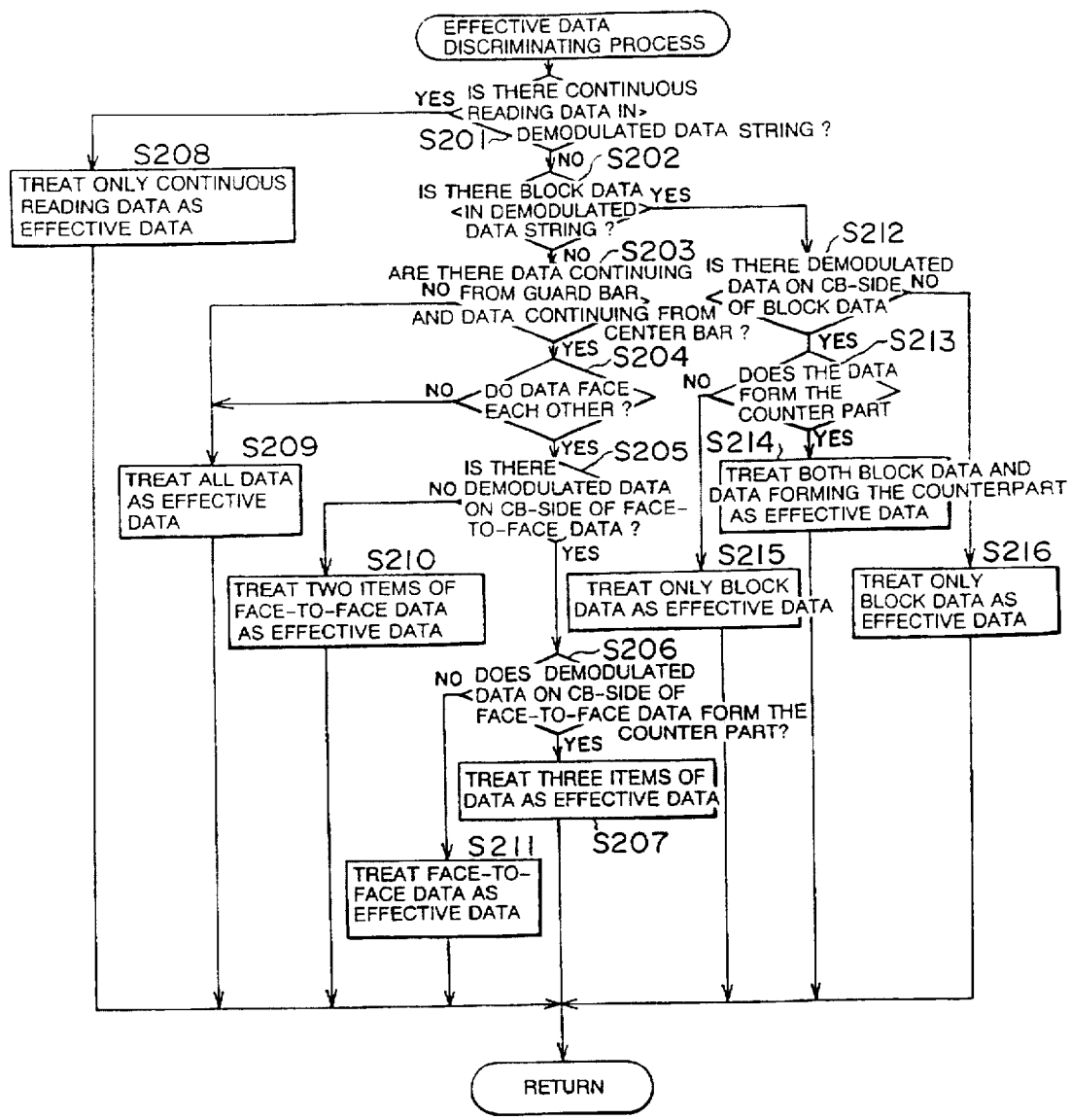
FIG. 7 is a flowchart showing an effective data discriminating process executed in step S008 of FIG. 3.

FIG. 7 is a flowchart showing this effective data discrimination processing subroutine. Checked in first step S201 after entering this subroutine is whether the demodulated data based on the "continuous reading" are included in the demodulated data string to be processed. This check is performed based on whether there are a series of demodulated data including all of the start guard bar (LGB), the center bar (CB) and the end guard bar (RGB). A data part interposed between the start guard bar (LGB) and the end guard bar (RGB) is hereinafter called "continuously read data".

Then, if the continuous read data is included, in step S208, only this item of continuously read data is treated as effective data. Therefore, portions other than exclusive of the continuously read data in the demodulated data string are deleted. After the process described above, the effective data discriminating process subroutine is finished, and the processing is returned to the main routine in FIG. 3.

In contrast with this, when it is determined that the continuously read data is not included in the demodulated data to be processed in step S201, it is checked in next step S202 whether or not the demodulated data based on the "block reading" is included in the demodulated data string to be processed. This check is executed based on whether there is the demodulated data in such a form that the data characters are interposed between the start guard bar (LGB) or the end guard bar (RGB) and the center bar (CB). This data part interposed between the start guard bar (LGB) or the end guard bar (RGB) and the center bar (CB) is hereinafter referred to as "block data".

Then, if the block data is included, it is checked in step S212 whether the demodulated data is included in an outer portion of the block data on the side of the center bar (CB) in the demodulated data string to be processed.

Then, if the demodulated data is not included in the outer portion of the block data on the side of the center bar (CB), in step S216, only this item of block data is treated as the effective data. Therefore, portions other than the block data in th demodulated data string are deleted. After the above process, this effective data discriminating process subroutine is ended, and the processing is returned to the main routine in FIG. 3.

Contrastingly, when it is determined that the demodulated data is included in the outer portion of the block data on the side of the center bar (CB), it is checked in step S213 whether the demodulated data included in the outer portion of the block data on the side of the center bar (CB) forms a counterpart of the block data with the center bar (CB) put therebetween. Herein, the data forming the counterpart has such a structure that the data characters continue subsequently to the center bar (CB) or a structure that the data includes other guard bar, and the data characters continue from this guard bar toward the center bar (CB).

Then, if the demodulated data included in the outer portion of the block data on the side of the center bar (CB) is defined as the data forming the counterpart, in step S214, both of the block data and the data forming the counterpart thereof are treated as the effective data. Therefore, there are deleted the outer portions of the block data on the sides of the guard bars (LGB, RGB) in the demodulated data string and also the outer portion of the data forming the counterpart. After the above process has been done, this effective data discriminating process subroutine is finished, and the processing is returned to the main routine in FIG. 3.

Whereas, if the demodulated data included in the outer portion of the block data on the side of the center bar (CB) is not the data forming the counterpart thereof in step S215, only this item of block data is treated as the effective data. Therefore, the portions other than the block data in the demodulated data string are deleted. After the above process, this effective data discriminating process subroutine is ended, and the processing is returned to the main routine in FIG. 3.

On the other hand, when it is determined that the block data is not included in the demodulated data string to be processed in step S202, it is checked in step S203 whether or not the data characters continuing subsequently from the guard bars (LGB, RGB) and the data characters continuing subsequently from the center bar (CB) are included in the demodulated data string to be processed.

Then, if the data characters continuing subsequently from the guard bars (LGB, RGB) and the data characters continuing subsequently from the center bar (CB) are not included therein, there must be a possibility in which demodulated data included in the demodulated data string are obtained by reading the bar code. Hence, in step S209, all pieces of data included in this demodulated data string are treated as the effective data. After the above-described process, this effective data discriminating process subroutine comes to an end, and the processing is returned to the main routine in FIG. 3.

Contrastingly, when it is determined that the data characters continuing subsequently from the guard bar (LGB, RGB) and the characters continuing subsequently from the center bar (CB) are included therein, it is checked in step S204 whether these two items of demodulated data bear a face-to-face relationship with each other. Namely, it is checked whether the data characters continuing from the guard bar (LGB, RGB) and the data characters continuing from the center bar extend toward each other.

Then, if the two items of demodulated data do not bear in the face-to-face relationship, there must be such a possibility that both items of demodulated data are obtained by reading the bar code. Therefore, in step S209, all pieces of demodulated data included in this demodulated data string are treated as the effective data. After the above-described process, this effective data discriminating process subroutine is ended, and the processing is returned to the main routine in FIG. 3.

Contrastingly, when it is determined the two items of demodulated data bear the face-to-face relationship, it can be considered that a middle portion of a block data happen to be lost for some reason. Checked subsequently in step S205 is whether demodulated data are included in the outer portions of the two items of demodulated data on the side of the center bar (CB).

Then, if the demodulated data are not included in the outer portions of the two items of demodulated data bearing the face-to-face relationship on the side of the center bar (CB), in step S210, only the two items of demodulated data bearing face-to-face relationship are treated as the effective data. Therefore, outer portions of the two items of demodulated data bearing the face-to-face relationship in this demodulated data string are deleted. After the above process, this effective data discriminating process subroutine is finished, and the processing is returned to the main routine in FIG. 3.

Contrastingly, when it is determined that the demodulated data are included in the outer portions of the two items of demodulated data bearing the face-to-face relationship on the side of the center bar (CB) in step S205, it is checked in step S206 whether the demodulated data included in the outer portions of the two items of demodulated data bearing the face-to-face relationship on the side of the center bar (CB) form a counterpart of the groups with the centered bar (CB) put therebetween. Herein, the data forming the counterpart has such a structure that the data characters continue subsequently to the center bar (CB) or a structure that the data includes other guard bar, and the data characters continue from this guard bar toward the center bar (CB).

Then, if it is determined that the demodulated data forms the counterpart in step S207, three groups of demodulated data including the data forming the counterpart data are treated as the effective data. Therefore, there are deleted the outer portions of the two items of demodulated data bearing the face-to-face relationship and the demodulated data forming the counterpart in this demodulated data string. After the above process has been done, this effective data discriminating process subroutine is finished, and the processing is returned to the main routine in FIG. 3.

Contrastingly, if it is determined in step S206 that the determined data does not form the counterpart, only the two items of demodulated data bearing the face-to-face-relationship are treated as the effective data in step S211. Therefore, the outer portions of the two items of demodulated data bearing the face-to-face relationship in this demodulated data string are deleted. After the above-mentioned process, this effective data discriminating process subroutine comes to an end, and the processing goes back to the main routine in FIG. 3.

In the main routine to which the processing is returned, the processing proceeds from step S008 to step S009.

In step S009, all the demodulated data stored in the demodulated data temporary saving buffer 6 are transferred into a demodulated data storage buffer 7, wherein a data synthesizing process (corresponding to a synthesizing unit) is executed. This synthesizing process is carried out by applying each piece of demodulated data to the WPC format with the guard bar or/and the center bar (CB) included in the demodulated data as clues.

In next step S010, a modulus 10 check is executed. This modulus 10 check is a checking process of determining whether the demodulated data corresponding to the whole bar code are successfully acquired by the synthesizing process in step S009. If a result of this modulus 10 check is NG (indicating a failure of acquiring the demodulated data), this implies that all the demodulated data are not yet prepared, and therefore the processing returns to step S001 to execute the demodulating process for the bar width data set read by a new laser beam scan.

Contrastingly, if the result of the modulus 10 check is OK (indicating a success in the acquisition of the demodulated data corresponding to the whole bar code), this implies the acquisition of the read data by the "continuous reading" or a completion of synthesizing the data as a result of step S009. Hence, this bar code recognizing/demodulating process is ended.

(Operation of Embodiment)

Next, the operation of the above-constructed bar code reading apparatus in accordance with this embodiment will be explained with reference to FIGS. 14 through 17. Note that the symbol "GB" throughout these Figures designates the demodulated data (or the noise data assuming the same configuration in terms of appearance thereof) corresponding to the start guard bar (LGB) or the end guard bar (RGB) shown in FIG. 19. Further, the symbol "CB" represents the demodulated data (or the noise data assuming the same configuration in terms of appearance thereof) corresponding to the center bar (CB) shown in FIG. 19. Furthermore, the symbols "A-", "B-" or "C-" denotes the demodulated data or the noise data obtained by demodulating the data characters.

Figure 14:
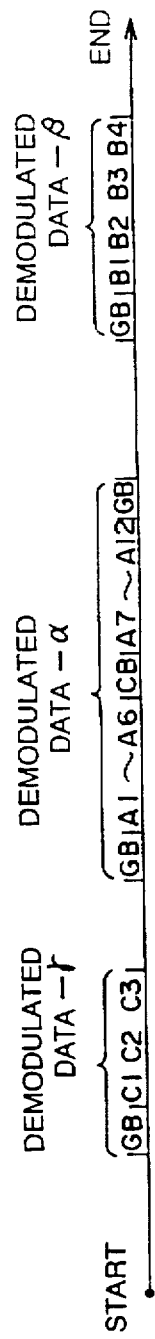
FIG. 14 is a diagram illustrating a specific example of a demodulated data string; trajectories on the bar code

To start with, as illustrated in FIG. 14, it is assumed that there is obtained a demodulated data string continuing in such a sequence as demodulated data $\gamma$, demodulated data $\alpha$ and demodulated data $\beta$. In this case, the demodulated data $\alpha$ can be considered to be an item of continuous read data obtained by scanning the whole bar code with the laser beams L without stopping. Accordingly, only the demodulated data $\alpha$ defined as continuously read data is treated as the effective data. Therefore, the demodulated data $\beta$ and the demodulated data $\gamma$ are conceived as the noise data demodulated based on sheet surface noises or letters, etc. and therefore deleted (S208).

Next, as shown in FIG. 15, it is assumed that a demodulated data string continuing in such a sequence as the demodulated data $\alpha$ and the demodulated data $\beta$. In this case, the demodulated data $\alpha$ is considered to be the block data obtained by scanning a left block of the bar code with the laser beams. Hence, the demodulated data $\alpha$ defined as the block data is treated as the effective data. On the other hand, the demodulated data $\beta$ takes such a form that the start guard bar (LGB) is detected posterior to the demodulated data $\alpha$. Because of rectilinear scanning with the laser beams, however, the above demodulated data $\beta$ is logically impossible. Accordingly, this item of demodulated data $\beta$ is conceived as the noise data demodulated based on the sheet surface and the letters, etc. and therefore deleted (S215).

Incidentally, if the demodulated data $\beta$ takes such a form that the end guard bar (RGB) is detected after demodulating the several data characters, it can be considered that the demodulated data $\beta$ is logically possible. Accordingly, in such a case, both of the demodulated data $\alpha$ and the demodulated data $\beta$ are treated as the effective data (S214).

On the other hand, if the demodulated data $\beta$ takes such a structure that the data characters continue to and from on both sides of the center bar (CB), it can be considered the demodulated data $\beta$ is logically impossible. Accordingly, in such a case, only the demodulated data $\alpha$ is treated as the effective data, and the demodulated data $\beta$ is deleted (S215).

Next, as shown in FIG. 16, it is assumed that there is obtained a demodulated data string continuing in such a sequence as the demodulated data $\alpha$, the demodulated data $\beta$ and the demodulated data $\gamma$. In this case, the demodulated data $\alpha$ including the guard bar (GB) and the demodulated data $\beta$ including the center bar (CB) are conceived as data separated from each other due to a smudge or the like at a middle point of the left block of the bar code which is scanned by the laser beams L. Therefore, the demodulated data $\alpha$ and the demodulated data $\beta$ are treated as the effective data. On the other hand, in the case that the demodulated data $\alpha$ and the demodulated data $\beta$ are conceived as the demodulated data obtained by demodulating the right block of the bar code, the demodulated data $\gamma$ taking such a structure that the right block is again scanned can be considered to be logically impossible. Accordingly, the demodulated data $\gamma$ is deleted (S211).

Next, as shown in FIG. 17, it is assumed that a demodulated data string continuing in such a sequence as the demodulated data $\alpha$ and the demodulated data $\beta$. In this case, both of the two items of demodulated data $\alpha$, $\beta$ take such a structure that the data characters continue from the guard bar (GB). Therefore, any item of demodulated data has a possibility of being the demodulated data based on the bar code. Accordingly, in this case, the two items of demodulated data $\alpha$, $\beta$ are treated as the effective data (S209).

In this manner, before the synthesizing process (S009), only the effective data are left, and the demodulated data logically conceived as the noise data are deleted previously. Hence, a quantity of the demodulated data serving as an object for the data synthesizing process is remarkably reduced, and an entire processing time for the data synthesizing process is reduced. Besides, the possibility of misreading is restrained low.

Second Embodiment

A characteristic of a second embodiment of the present invention is, as compared with the first embodiment discussed above, that all the demodulated data included in the demodulated data string to be processed are not treated as the effective data in step S209 in the effective data discriminating process subroutine (FIG. 7) and that the effective data are determined by comparing a distortion quantity of each item of demodulated data.

Figure 18:
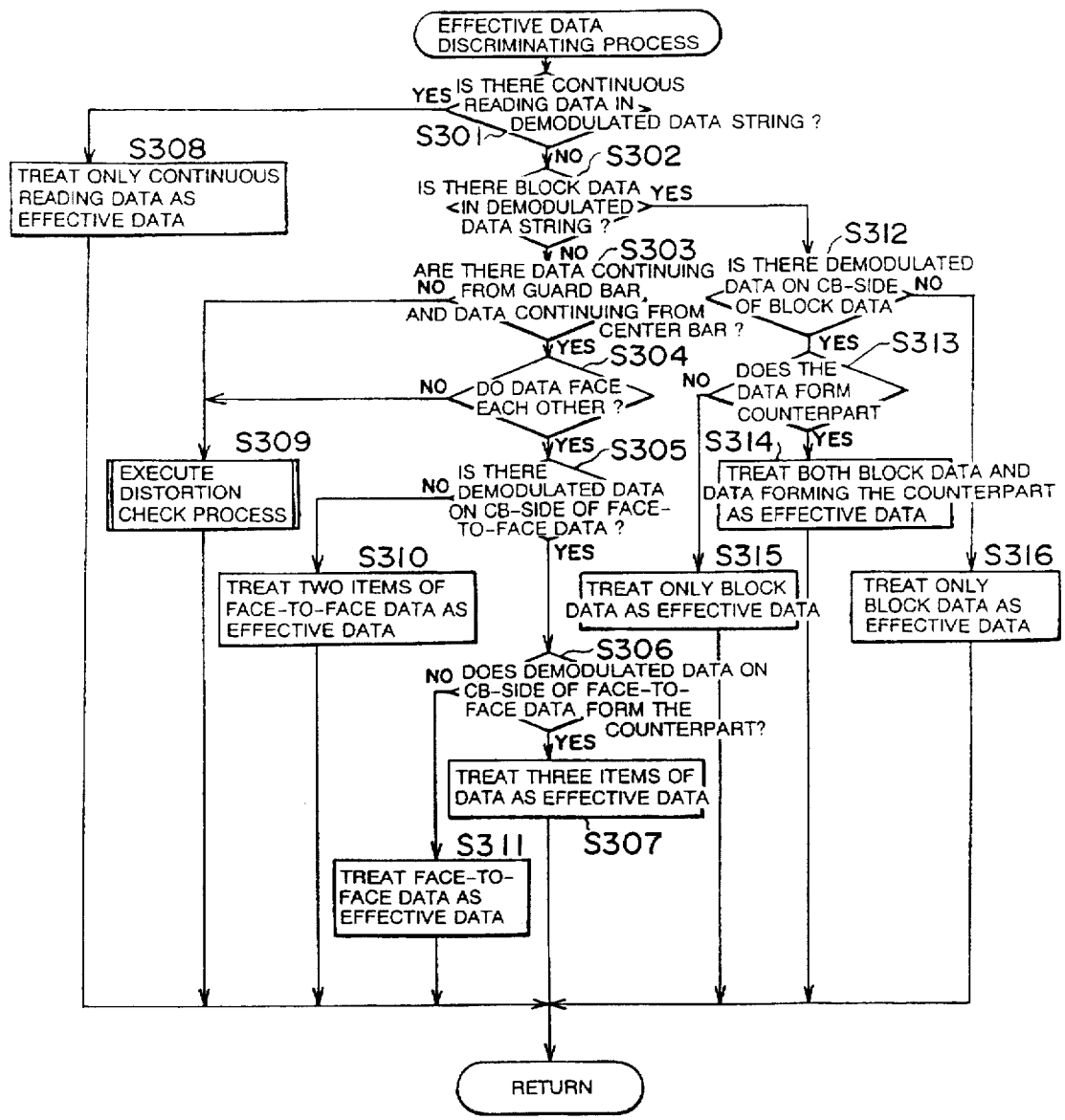
FIG. 18 is a flowchart showing a content of the effective data discriminating process executed in step S008 of FIG. 3 in a second embodiment of the present invention.

FIG. 18 is a flowchart showing the effective data discriminating process subroutine executed in step S008 in FIG. 3 in accordance with the second embodiment. FIG. 18 corresponds to FIG. 7 in the first embodiment, wherein only a process in step S309 is different from the process (S209) in FIG. 7, and other processes are the same.

Figure 19:
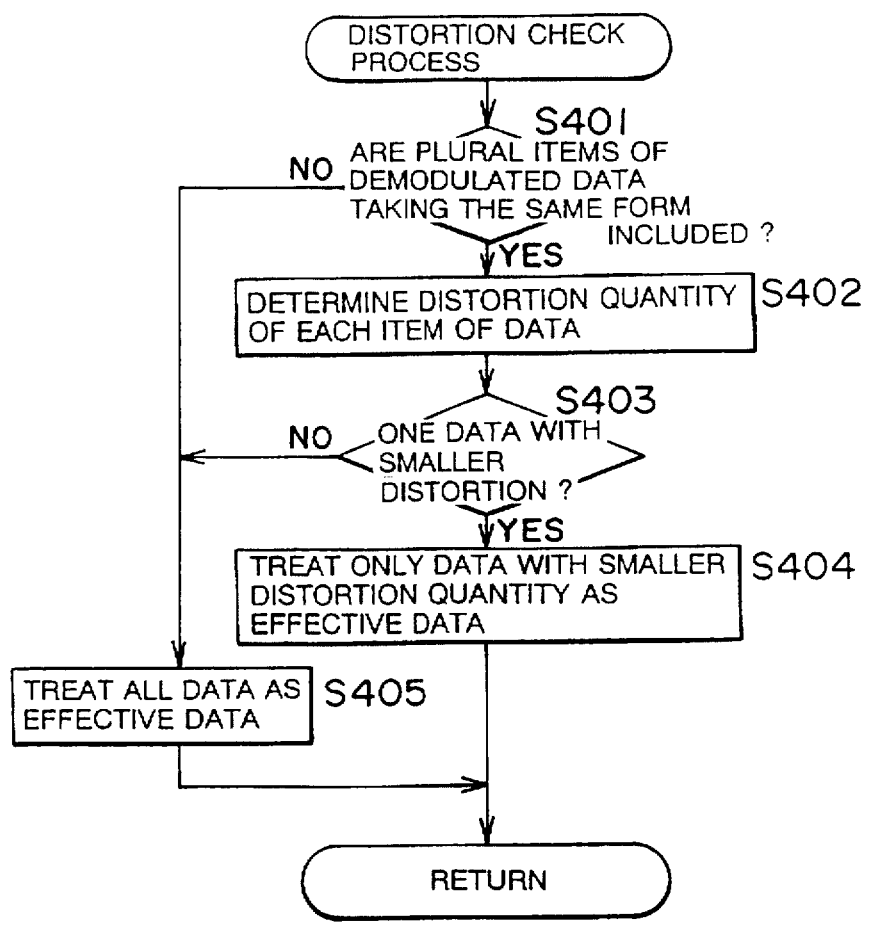
FIG. 19 is a flowchart showing a content of a distortion check process executed in step S309 of FIG. 18.
Figures 20, 21:
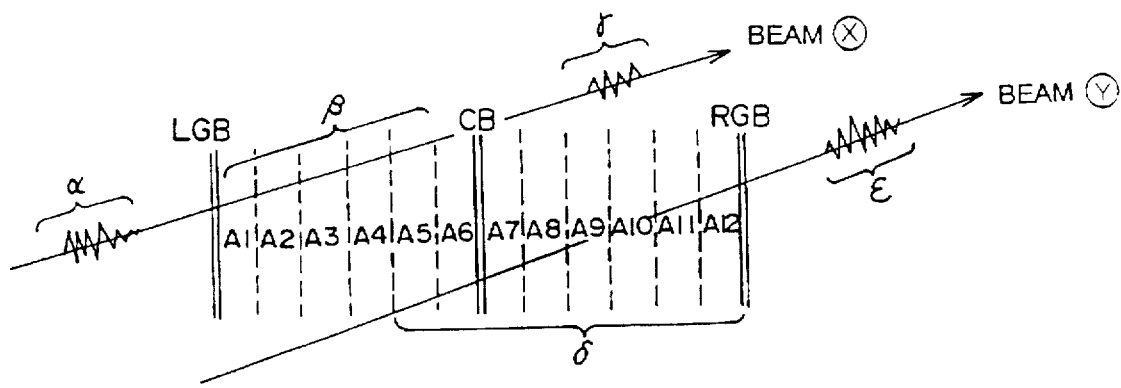
FIG. 20 is a diagram showing an example of a scan trajectory on the bar code.
FIG. 21 is a list of the demodulated data demodulated for every scan trajectory.

In step S309 in FIG. 18, a distortion check process is executed. FIG. 19 is a flowchart showing this distortion check process subroutine. Checked in first step S401 after entering this subroutine is whether plural items of demodulated data having the same structure are included in the demodulated data string to be processed. In other words, there are checked whether the plural items of demodulated data having such a structure that the data characters continue from the guard bar in the same direction are included therein, and whether the plural items of demodulated data having such a structure that the data characters continue from the center bar (CB) in the same direction are included therein. Then, if the plural items of demodulated data having the same structure are not included therein, the processing proceeds to step S405.

Whereas if the plural items of demodulated data having the same structure are included therein, the distortion quantity of each item of demodulated data is determined. More specifically, character lengths of the respective adjacent characters included in each item of demodulated data are compared with each other. An occupy rate of the number of such characters of which distortion quantity concerning the adjacent character is large with respect to a total number of characters, is calculated as a distortion quantity of the whole item of demodulated data. Alternatively, the δ-distances of the respective bars that included in the respective items of demodulated data are compared with each other. Then, an occupy rate of the number of the δ-distances of which distortion quantity concerning other δ-distance is large with respect to a total number of modules is calculated as a distortion quantity of the whole item of demodulated data. Alternatively, lengths of the individual bars included in the respective items of demodulated data are compared with each other. Then, an occupy rate of the number of bars of which distortion quantity concerning the adjacent bar is large with respect to a total number of bars, is calculated as a distortion quantity of the whole item of demodulated data.

In step S403 executed after determining the distortion quantity of each item of demodulated data, there is checked whether the distortion quantity of one item of demodulated data is smaller than the distortion quantity of the other item of demodulated data. Then, if the distortion quantities of the two items of demodulated data are equal, the processing proceeds to step S405.

Whereas, if the distortion of one item of demodulated data is smaller than the distortion quantity of the other item of demodulated data, in step S404, only the demodulated data with the smaller distortion quantity is treated as the effective data. Therefore, the item of demodulated data with the larger distortion quantity is deleted. Then, thereafter, the processing returned to steps in FIG. 18.

On the other hand, in step S405, all the demodulated data included in the demodulated data string to be processed are treated as the effective data, and the processing is returned to steps in FIG. 18.

In the second embodiment with the construction described above, as shown in FIG. 17, it is assumed that there is obtained a demodulated data string continuing in such a sequence as the demodulated data α and the demodulated data β. In this case, the distortion quantities of the two items of demodulated data α, β are compared, and only the demodulated data with the smaller distortion quantity is made effective (S404). Further, if the distortion quantities of the two items of demodulated data α, β are equal, there must be such a possibility that the both items of demodulated data are obtained by reading the bar code, and hence each item of demodulated data is treated as the effective data (S405).

Since other constructions and operations in the second embodiment are the same as those in the first embodiment, the explanations thereof are omitted.

The bar code reading apparatus constructed in the manner given above according to the present invention is capable of reducing both the entire processing time for the "divided reading" and the possibility of misreading by logically deleting the noise data out of the data string obtained by the laser beam scanning.

This invention being thus described, it will be obvious that the same may be varied in same ways. Such variations are not to be regarded as a departure from the spirit and scope of the invention, and all such medications as would be obvious to one skilled in the art are intended to be included within the scope of the following claims.

We claim:

1. A bar code reading apparatus comprising:

scanning means for scanning a surface repeatedly to detect bright/dark patterns along scan trajectories on the surface;

start-of-scan detecting means for detecting a start of each scan performed by said scanning means;

end-of-scan detecting means for detecting an end of each scan performed by said scanning means;

demodulating means for demodulating each bright/dark pattern that is detected by said scanning means during a period from a timing when said start-of-scan detecting means detects the start of each scan to a timing when said end-of-scan detecting means detects the end of each scan to output a series of demodulated data;

effective data extracting means for extracting, as effective data, only a portion having a possibility of corresponding to a bar code from a series of demodulated data that is outputted by said demodulating means; and synthesizing means for synthesizing plural pieces of the effective data for a plurality of scan that are extracted by said effective data extracting means to reproduce data encoded in the bar code.

2. A bar code reading apparatus according to claim 1, wherein said scanning means scans the bar code having such a structure that an encoded data area is divided into two blocks by a single center bar having a fixed pattern and also interposed by two pieces of guard bars having fixed patterns.

3. A bar code reading apparatus according to claim 2, wherein said effective data extracting means extracts, as the effective data, a portion having a structure of being divided into two blocks by the single center bar having the fixed pattern and interposed between the two guard bars having the fixed patterns.

4. A bar code reading apparatus according to claim 2, wherein said effective data extracting means extracts, as the effective data, a portion having a structure of being interposed between the single center bar and the single guard bar.

5. A bar code reading apparatus according to claim 4, wherein said effective data extracting means also extracts, as the effective data, an item of demodulated data continuing from the center bar positioned outside the portion.

6. A bar code reading apparatus according to claim 4, wherein said effective data extracting means also extracts, as the effective data, an item of demodulated data continuing from another guard bar positioned outside of the portion toward the center bar.

7. A bar code reading apparatus according to claim 2, wherein said effective data extracting means extracts, as the effective data, an item of demodulated data continuing from the single center bar and another item of demodulated data continuing from the single guard bar both of which extend toward each.

8. A bar code reading apparatus according to claim 7, wherein said effective data extracting means also extracts, as the effective data, another item of demodulated data continuing from the center bar in a direction opposite to the single guard bar.

9. A bar code reading apparatus according to claim 7, wherein said effective data extracting means also extracts, as the effective data, another item of demodulated data continuing from another guard bar positioned on the side opposite to the single guard bar with the center bar being centered.

10. A bar code reading apparatus according to claim 2, wherein if plural pieces of data having a same structure of continuing from a guard bar in one direction are included in the series of demodulated data, said effective data extracting means extracts all these pieces of data as the effective data.

11. A bar code reading apparatus according to claim 2, wherein if plural pieces of data having a same structure of continuing from a guard bar in one direction are included in the series of demodulated data, said effective data extracting means extracts only the data with a smaller distortion quantity as the effective data.

12. A bar code apparatus according to claim 2, wherein if plural pieces of data having a same structure of continuing from the center bar in one direction are included in the series of demodulated data, said effective data extracting means extracts all these pieces of data as the effective data.

13. A bar code reading apparatus according to claim 2, wherein if plural pieces of data having a same structure of continuing from the center bar in one direction are included in the series of demodulated data, said effective data extracting means extracts only the data with a smaller distortion quantity as the effective data.

* * * * *